United States Patent [19]

Schiemann

[11] Patent Number: 4,569,816

[45] Date of Patent: Feb. 11, 1986

[54] METHOD OF MANUFACTURING A CANISTER

[76] Inventor: Wolfram Schiemann, Eugen-Nagele-Strasse 17, 7140 Ludwigsburg, Fed. Rep. of Germany

[21] Appl. No.: 688,681

[22] Filed: Jan. 3, 1985

[51] Int. Cl.[4] .............. B29C 49/06; B29C 49/18; B29C 49/22

[52] U.S. Cl. .................... 264/513; 264/526; 264/529; 264/531; 264/532; 264/533

[58] Field of Search .............. 264/513, 526, 529, 531, 264/532, 533, 534; 425/523

[56] References Cited

U.S. PATENT DOCUMENTS

| 3,371,376 | 3/1968 | Fischer et al. | 264/531 X |
|---|---|---|---|
| 3,452,391 | 7/1969 | Langecker | 264/531 X |
| 3,878,282 | 4/1975 | Bonis et al. | 264/513 |
| 4,013,748 | 3/1977 | Valyi | 425/523 X |
| 4,086,314 | 4/1978 | Lampart et al. | 264/531 X |
| 4,280,859 | 7/1981 | Thompson | 264/513 X |
| 4,397,629 | 8/1983 | Akutsu et al. | 264/533 X |

FOREIGN PATENT DOCUMENTS

| 1950212 | 4/1971 | Fed. Rep. of Germany | 264/513 |
|---|---|---|---|
| 3008737 | 9/1981 | Fed. Rep. of Germany | 264/513 |

*Primary Examiner*—Jan Silbaugh

[57] ABSTRACT

A pot-shaped blank is shaped from nylon by the injection moulding process. Onto the blank a pot-shaped outer layer of polyethylene is moulded. The coated blank is finish shaped to canister form by a blowing process. The result is a "bonded structure" that substantially prevents permeation of aromatic substances and acyclic and alicyclic compounds. The method is particularly suitable for manufacturing canisters to hold lead-free gasoline.

11 Claims, 2 Drawing Figures

METHOD OF MANUFACTURING A CANISTER

The invention relates to a method of manufacturing a canister for gasoline (petrol) or the like.

BACKGROUND OF THE INVENTION

Canisters differ from motor vehicle tanks above all in that in normal use they are tightly sealed. In other words, they have no ventilation. A consequence of this is that often considerable internal pressure is created in the closed canister, which constitutes a substantial loading on the canister and its closure means. In addition, canisters must be able to withstand certain test loadings. For example, they must remain stationary on a flat surface which is inclined at 20°. They must be able to withstand being dropped from a height of 10 meters without damage and only a quite specific and extremely small quantity of the contents may be lost within a given time. Materials used hitherto have been sufficiently tight where they have to hold gasoline (petrol) which contains lead. There is, however, an increasing endeavour to achieve lead-free petrol which then instead of the lead contains other additives, for example aromatic substances, acyclic and alicyclic compounds. The materials long since used for plastic canisters suffer however from considerable permeation, particularly in respect of these additives, so that they cannot comply with legal requirements.

Methods have therefore been developed whereby canisters consisting of standard polethylene are subsequently provided with a barrier layer by the sulphonation process or fluorination process. This coating is however very thin and correspondingly the barrier action is not very great. In the most favourable case, a permeation reduction of 25% is achieved. This value furthermore relates to motor vehicle tanks in which, of course, there is no internal pressure. Because the internal pressure in canisters accelerates permeation, these methods are not adequate for the particular field of application which involves canisters.

OBJECT AND STATEMENT OF THE INVENTION

The object of the invention is a method of manufacturing a canister of the type mentioned, which provides canisters which can be used successfully with lead-free petrol. At the same time, of course, manufacture should be at a favourable cost so that such canisters are capable of being marketed in competition with sheet metal canisters. This object is achieved by the following steps:

injection molding a pot-shaped blank of material which inhibits permeation of ingredients selected from the group comprising acyclic and alicyclic compounds and aromatic substances contained in gasoline and the like, injection molding a pot-shaped outer layer onto said pot-shaped blank, of material which substantially determines the mechanical strength of the canister, and blowing said pot-shaped blank and said outer layer to finished canister form.

The advantage of the method according to the invention lies above all in that the barrier layer is constituted by what is initially an independent blank, so that this can be given correspondingly adequate wall thicknesses. By virtue of the fact that the outer layer is then injected onto this blank, there is on the one hand a satisfactory connection between both materials, while on the other hand the manufacturing process is simplified. The "bonded blank" manufactured in this way is then finished-shaped to canister form by the known blowing process.

Advantageously, the invention includes the following additional features.

The pot-shaped blank is injection molded of non-hygroscopic nylon material.

The pot-shaped outer layer is injection molded of polyethylene material.

The pot-shaped outer layer is injection molded of high molecular polyethylene material having a density in the range of medium to high.

These are particularly preferred materials.

An annular collar is injection molded at the open end of said pot-shaped blank, which widens outwardly and radially, to overlap the edge of the canister opening in its furnished form. As a result, the material of the blank extends over all areas of the canister which will subsequently and in normal use enclose the petrol. Thus, particularly in the region of the canister opening, the edge formed by the outer layer is covered so that when the closure means if fitted, the petrol only comes in contact with the blank material. This is particularly important if the outer layer consists of polyethylene which is steeped in aromatic hydrocarbons. The protective annular collar prevents such an effect.

Radial projections are injection molded integrally with said outer layer, which form at least one canister handle and two stand strips disposed opposite each other on what will be the underside of the canister in its finished form. This provides on the one hand, and in a very convenient way from the point of view of manufacture, at least one canister carrying handle. The stand strips have a two-fold function. First, they increase the rigidity of the canister when it is standing. Secondly, they allow an acceleration of and improvement in the forming operation in which said pot-shaped blank and said outer layer are preliminarily blowed. During preliminary blowing, moveable gripping strips grip and pull said stand strip projections in the direction fo their final positions in the finished canister form. Another consequence is that the coated blank is drawn symmetrically into the blowing mold without difficulty so that there are no irregular wall thicknesses. The moulding process is ideally accelerated by preliminarily blowing said pot-shaped blank and said outer layer, during which a longitudinally divided core is inserted into said pot-shaped blank and spread open. At the same time an even stretching of the individual wall parts is promoted. Other valuable steps of the invention are as follows:

Removing said core from said pot-shaped blank, shaping the neck portion of the canister opening to the position intended in the finished canister form, and then applying blowing pressure to shape said pot-shaped blank and said outer layer to finished canister form.

Vacuum-assisting the shaping of said pot-shaped blank and said outer layer to finished canister form. Thickening the walls of said pot-shaped blank and said outer layer in areas especially weakened by subsequent blowing. Forming a finished canister in the range of 5 to 10 liters. Molding a canister handle integrally with said outer layer, which serves as a clip support for a liquid delivery tube, and forming a finished canister in the 5 liter range.

DESCRIPTION OF THE DRAWING

A preferred embodiment of the invention is explained in greater detail hereinafter with reference to the accompanying drawing, in which.

Figure 1:
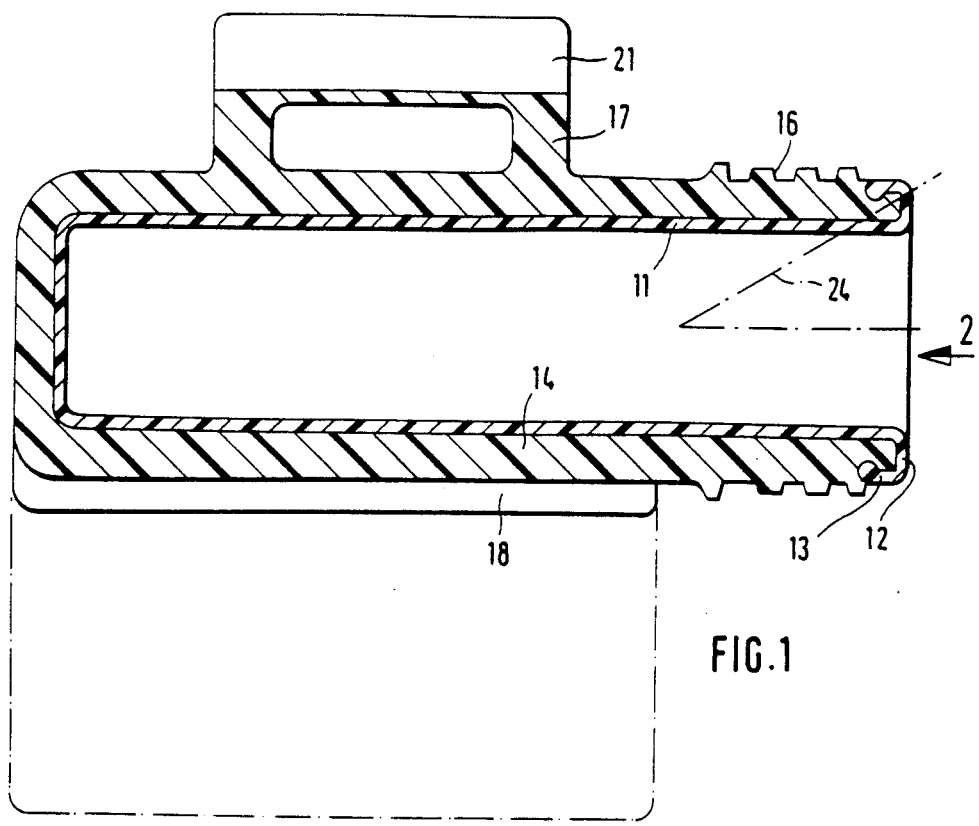
FIG. 1 shows a longitudinal section through a coated blank according to the method of the invention.

The drawing relates to a 5-liter canister and is also shown on a smaller scale.

DETAILED DESCRIPTION

As the first step in the method, a pot-shaped blank 11 consisting for example of a non-hygroscopic nylon, is produced by injecting moulding. At its open end it has integrally moulded into a radially outwardly extending annular collar 12 which expediently has a shoulder 13 which is turned back in an axial direction. The wall thickness of the blank 11 may be 1 to 2 mm.

As the second step in the process, a likewise pot-shaped outer layer 14, for example of polyethylene, is injected onto the blank 11, a corresponding injection mould already resulting in the screwthread 16 being moulded in the region of what will later be the canister opening, radially projecting integrally moulded shapes 17, 18 and 19 also being formed thereby. The integrally moulded shape 17 is designed to be a centrally located canister carrying handle.

Ideally, this handle is also and at the same time constructed as a clip-in holder 21 for a delivery tube, not shown. Since the outer layer 14 is essentially responsible for the mechanical strength of the canister, its wall thickness is also correspondingly greater.

The blank 11 coated with the outer layer 14 is then fitted onto a core which is divided in two in the longitudinal direction, but which is not shown in the drawing, which is in addition heated and its outside surrounded by a heated mould. At the same time, air is blown under pressure into the interior of the blank 11 to encourage the stretching. This procedural step of preliminary blowing is further assisted in that gripper strips, likewise not shown, are positioned in the blowing mould to grip the integrally moulded shapes 18 and 19 and to pull them in the direction of the arrows 22 and 23 towards their final position. This also ensures that the blank evenly fills the blowing mould, i.e. ensursuring for example that the left-hand wall is not thinner than the right-hand wall. Since here in addition the integrally moulded shapes 18 and 19 are intended to form standing strips on the finished canister, it is also important that they should actually be located in the corner zones. This, too, is guaranteed by the gripper strips.

Figure 2:
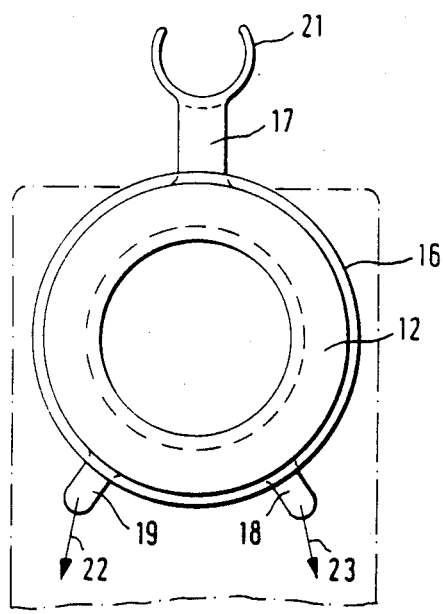
FIG. 2 is a front view in the direction of the arrow 2 in FIG. 1.

Normally the blowing process is sub-divided into two stages with the already discussed stage of preliminary blowing which is then followed by a second stage, at the end of which the final canister shape is achieved. For this, at the end of the preliminary blowing, the aforementioned two-part core is removed and the still warm and therefore malleable neck part (with the screwthread 16) is bent upwards into its final oblique position indicated by reference numeral 24. Finish-shaping in the heated blowing mould now takes place with the supply of compressed air into the interior of the blank 11, the shaping process being possibly encouraged by vacuum assistance, because then any air pockets which might disturb the final shape can be avoided. FIGS. 1 and 2 show the final form of the canister by dash-dotted lines. Here, too, the size relationships are not entirely accurate having regard to the drawing area available. It should, however, present no difficulty to match up the sizes in order to understand the invention.

The advantage of the "bonded structure" which can be achieved by this method resides in that the necessary barrier layer can without problem be made in the necessary wall thickness but that on the other hand only as much of this=expensive material is used as is actually required. The real carrying function is fulfilled by the less expensive polyethylene, and since this latter does not have to perform a sealing action, it can be dyed without problem and can also be mixed, for example, with carbon black in order to increase its electrical conductivity. This avoids electrostatic charges which might result in spark formation Therefore, the two materials satisfy different functions and at the same time make it possible to manufacture a canister which can meet with the numerous legal and practical requirements which occur. It is not particularly shown in the drawings but the wall thicknesses of the blank and of the outer layer can, in those areas which are more intensely weakened by the subsequent blowing process, be made thicker so that in the finished state, the wall thickness of the canister is true to the desired gauge. The aforedescribed method is particularly suitable for the manufacture of 5 and 10-liter canisters. preferably for 5-liter canisters. In the case of 10-liter canisters, it is above all the design of handle and the anchoring which will differ from the example illustrated, since with such canisters the usual desire will be to obtain what is known as the "jerry can". However, the outer shape of the canister does not in any way affect the principle of "bonded construction".

I claim:

1. Method of manufacturing a canister for gasoline and the like comprising:

injection molding a pot-shaped blank of material which inhibits permeation of ingredients selected from the group consisting of acyclic and alicyclic compounds and aromatic substances contained in gasoline; injection molding a pot-shaped outer layer onto said pot-shaped blank, of material which substantially determines the mechanical strength of the canister; and blowing said pot-shaped blank and said outer layer to finished canister form, injection molding radial projections integrally with said outer layer, which form at least one canister handle and two stand strips disposed opposite each other on what will be the underside of the canister in its finished form, and preliminarily blowing said pot-shaped blank and said outer layer, including gripping said stand strip projections by moveable gripper strips and pulling said stand strip projections in the direction of their final positions in the finished canister form.

2. Method according to claim 1, wherein said pot-shaped blank is injection molded of non-hygrosopic nylon material.

3. Method according to claim 1, wherein said pot-shaped outer layer is injection molded of polyethylene material.

4. Method according to claim 1, wherein said pot-shaped outer layer is injection molded of high molecular polyethylene material having a density in the range of medium to high.

5. Method according to claim 1, comprising injection molding an annular collar at the open end of said pot-shaped blank, which widens outwardly and radially, to overlap the edge of the canister opening in its furnished form.

6. Method according to claim 1, comprising preliminarily blowing said pot-shaped blank and said outer layer, including inserting a longitudinally divided core into said pot-shaped blank and spreading open said core.

7. Method according to claim 6, comprising removing said core from said pot-shaped blank, shaping the neck portion of the canister opening to the position intended in the finished canister form, and then applying blowing pressure to shape said pot-shaped blank and said outer layer to finished canister form.

8. Method according to claim 7, comprising vacuum-assisting the shaping of said pot-shaped blank and said outer layer to finished canister form.

9. Method according to claim 1, comprising thickening the walls of said pot-shaped blank and said outer layer in areas especially weakened by subsequent blowing.

10. Method according to claim 1, comprising forming a finished canister in the range of 5 to 10 liters.

11. Method according to claim 1, comprising molding a canister handle integrally with said outer layer, which serves as a clip support for a liquid delivery tube, and forming a finished canister in the 5 liter range.

* * * * *